United States Patent
Samra et al.

(10) Patent No.: US 6,470,435 B2
(45) Date of Patent: Oct. 22, 2002

(54) DUAL STATE RENAME RECOVERY USING REGISTER USAGE

(75) Inventors: Nicholas G. Samra, Austin, TX (US); Jacob Doweck, Haifa (IS); Belliappa Kuttanna, Austin, TX (US)

(73) Assignee: Intel Corporation, Santa Clara, CA (US)

(*) Notice: Subject to any disclaimer, the term of this patent is extended or adjusted under 35 U.S.C. 154(b) by 91 days.

(21) Appl. No.: 09/752,713

(22) Filed: Dec. 28, 2000

(65) Prior Publication Data

US 2002/0087837 A1 Jul. 4, 2002

(51) Int. Cl.[7] .............................................. G06F 12/00
(52) U.S. Cl. ...................... 711/202; 711/200; 711/154; 712/207
(58) Field of Search ................................ 711/200, 202, 711/203, 154; 712/205, 207, 233; 714/1

(56) References Cited

U.S. PATENT DOCUMENTS

| | | | | |
|---|---|---|---|---|
| 4,954,988 A | * | 9/1990 | Robb | ................... 365/189.02 |
| 5,623,617 A | * | 4/1997 | Davidian | ..................... 712/227 |
| 5,696,923 A | * | 12/1997 | Robertson et al. | .......... 711/202 |
| 5,903,742 A | * | 5/1999 | Shiell et al. | ................ 364/130 |
| 6,145,049 A | * | 11/2000 | Wong | ......................... 710/267 |
| 6,175,910 B1 | * | 1/2001 | Pauporte et al. | ............ 712/217 |
| 6,243,804 B1 | * | 6/2001 | Cheng | ........................ 712/228 |
| 6,370,640 B1 | * | 4/2002 | Dowling | ..................... 712/228 |

* cited by examiner

Primary Examiner—Tuan V. Thai
(74) Attorney, Agent, or Firm—Blakely, Sokoloff, Taylor & Zafman LLP

(57) ABSTRACT

An embodiment of the present invention includes a speculative rename table (SRT), a shadow array, and an update circuit. The SRT stores mapping of frequent and infrequent registers. The frequent registers are frequently modified by instructions dispatched from a processor core. The infrequent registers are infrequently modified by the instructions. The shadow array stores shadow registers. Each of the shadow registers contains a rename state of a corresponding frequent register after a branch instruction. The update circuit transfers contents of the shadow registers to the frequent registers based on a selection condition.

21 Claims, 3 Drawing Sheets

DUAL STATE RENAME RECOVERY USING REGISTER USAGE

BACKGROUND

1. Field of the Invention

This invention relates to computer architecture. In particular, the invention relates to register renaming.

2. Description of Related Art

A processor employing out of order execution may experience data hazards with respect to register operands. A method for handling these hazards is register renaming. In register renaming, the processor implements a set of physical registers. Typically, the number of physical registers is greater than the number of logical registers referenced by instructions. As instructions are issued, physical registers are assigned to the destination register operands of the instructions. A physical register number identifying the assigned physical register is provided for each destination operand. The correspondence between the physical registers and logical registers is kept track of.

Register renaming presents difficulties when instructions experience branch misprediction or exception conditions. This refers to an error in the execution of instructions which requires subsequent instructions to be discarded and instruction fetch to be started at a different address. Processors may perform branch prediction to speculatively fetch, issue, and execute instructions subsequent to conditional branch instructions. If the prediction is incorrect or the exception is not handle properly, the instructions subsequent to the branch instruction are discarded and instructions are fetched according to execution of the branch instruction. Additional exception conditions may include address translation errors for addresses of memory operands and other architectural or micro-architectural error conditions.

Because register renaming may have been applied to instructions which are subsequently discarded due to an exception, the mapping of logical registers to physical registers should be recovered to a state consistent with the instruction experiencing the exception.

Existing techniques for rename recovery include recovery at retirement, use of a re-order buffer, and use of a branch rename table. The recovery at retirement approach transfers all state from a retire table to a speculative rename table. The disadvantages of this approach include penalty for additional time to prepare the retire table because rename recovery cannot be started until the mispredicted branch is retired.

The re-order buffer approach keeps track of rename information at each unresolved branch. This approach may require a large implementation area, resulting in inefficient use of area. The branch rename table approach stores the rename state at the oldest unresolved branch. This approach is generally not able to accommodate other exception recovery cases and may not offer the best performance speed.

BRIEF DESCRIPTION OF THE DRAWINGS

The features and advantages of the present invention will become apparent from the following detailed description of the present invention in which.

DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
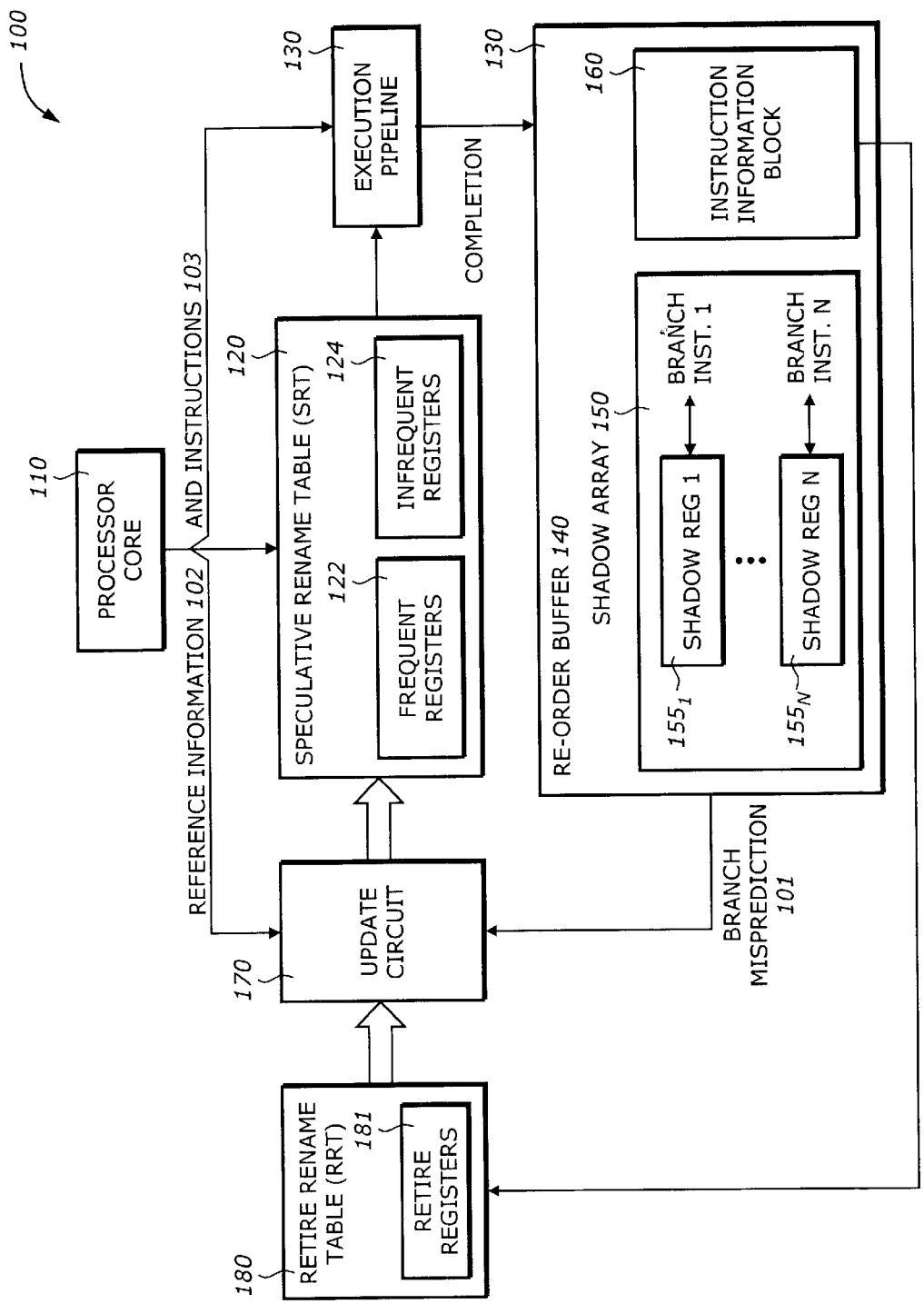
FIG. 1 is a diagram illustrating a processor in which one embodiment of the invention can be practiced.

FIG. 1 is a diagram illustrating a processor 100 in which one embodiment of the invention can be practiced. The processor 100 represents a central processing unit of any type of architecture, such as complex instruction set computers (CISC), reduced instruction set computers (RISC), very long instruction word (VLIW), or hybrid architecture. In one embodiment, the processor 100 is compatible with the Intel Architecture (IA) processor, such as the IA-32 and the IA-64. The processor 100 includes a processor core 110, a speculative rename table (SRT) 120, an execution pipeline 130, a re-order buffer 140, an update circuit 170, and a retire rename table (RRT) 180.

The processor core 110 includes circuits to fetch instructions, decodes, and dispatched instructions 103 for execution. The processor core 110 may also includes other circuits that are not necessary for the understanding of the invention. The processor core 110 generates reference information 102 regarding how and what registers are modified by an instruction. The processor core 110 dispatches the reference information 102 and instructions to the SRT 120, the update circuit 170, and the execution pipeline 130.

The SRT 120 stores speculative register information for the dispatched instructions 103. The instruction may include the mapping of registers, the registers themselves, or any combination thereof. Examples of mappings include mappings of logical register to physical registers The SRT 120 implements a dual state mechanism for the rename recovery. There are two possible classifications for each register: a frequently modified class and an infrequently modified class. The SRT 120 includes mapping and other information for frequent registers 122 and infrequent registers 124. The frequent registers 122 are frequently modified by instructions 103 dispatched from the processor core 110, and the infrequent registers are infrequently modified by the instructions. The criteria to determine the frequency may be set in advance or dynamically changed according to the dynamic usage of the registers. For examples, the number of registers may be divided into two groups. The register references can be dynamically kept tracked of and a threshold (e.g., the average value) of reference is computed. Registers that have frequency references above this threshold are the frequent registers and those below the threshold are infrequent registers. Other heuristics can be employed to determine the usage frequency. For example, registers used only by microcode may be chosen as infrequent registers.

The execution pipeline 130 includes the pipeline stages to execute the instructions 103 as dispatched from the processor core 110. When an instruction execution is complete, the instruction is retired and the instruction information of the retired instruction is stored in the re-order buffer 140.

The re-order buffer 140 is a buffer that stores micro-ops of the instructions 103, associated memory addresses, and alias registers. The re-order buffer 140 includes a shadow array 150 and an instruction information block 160. The shadow array 150 stores N shadow registers $155_1$ to $155_N$. Each of the shadow registers $155_1$ to $155_N$ contains a rename state of all frequent registers after a branch instruction. The instruction information block 160 contains information about an instruction including the retirement information. The instruction information block 160 provides information to update the RRT 180. In particular, when a branch instruction is retired, the instruction information block 160 sends out signals to the update circuit 170 for a rename recovery if a copy condition is met, as will be explained later.

The update circuit 170 updates the SRT 120 according to a selection condition. The update circuit 170 essentially performs the rename recovery on the speculative frequent and infrequent registers 122 and 124, respectively, in the SRT 120. The update circuit 170 receives reference information 102 regarding register references and instruction exception condition from the processor core 110 and the re-order buffer 140.

The RRT 180 stores retire register information 181 for registers corresponding to instructions that are retired. The retire register information may include the mappings of registers themselves, or any combination thereof. The retire registers 181 corresponding to the frequent and infrequent registers 122 and 124, respectively, in the SRT 120. The retire register information or retire registers 181 contain rename states of the corresponding frequent and infrequent registers 122 and 124, respectively, at instruction retirement.

The SRT 120, the shadow array 150, the update circuit 170 form a rename recovery circuit to recover rename states of registers at branch misprediction. It is contemplated that the present invention can be used in exception situations other than branch misprediction.

Figure 2:
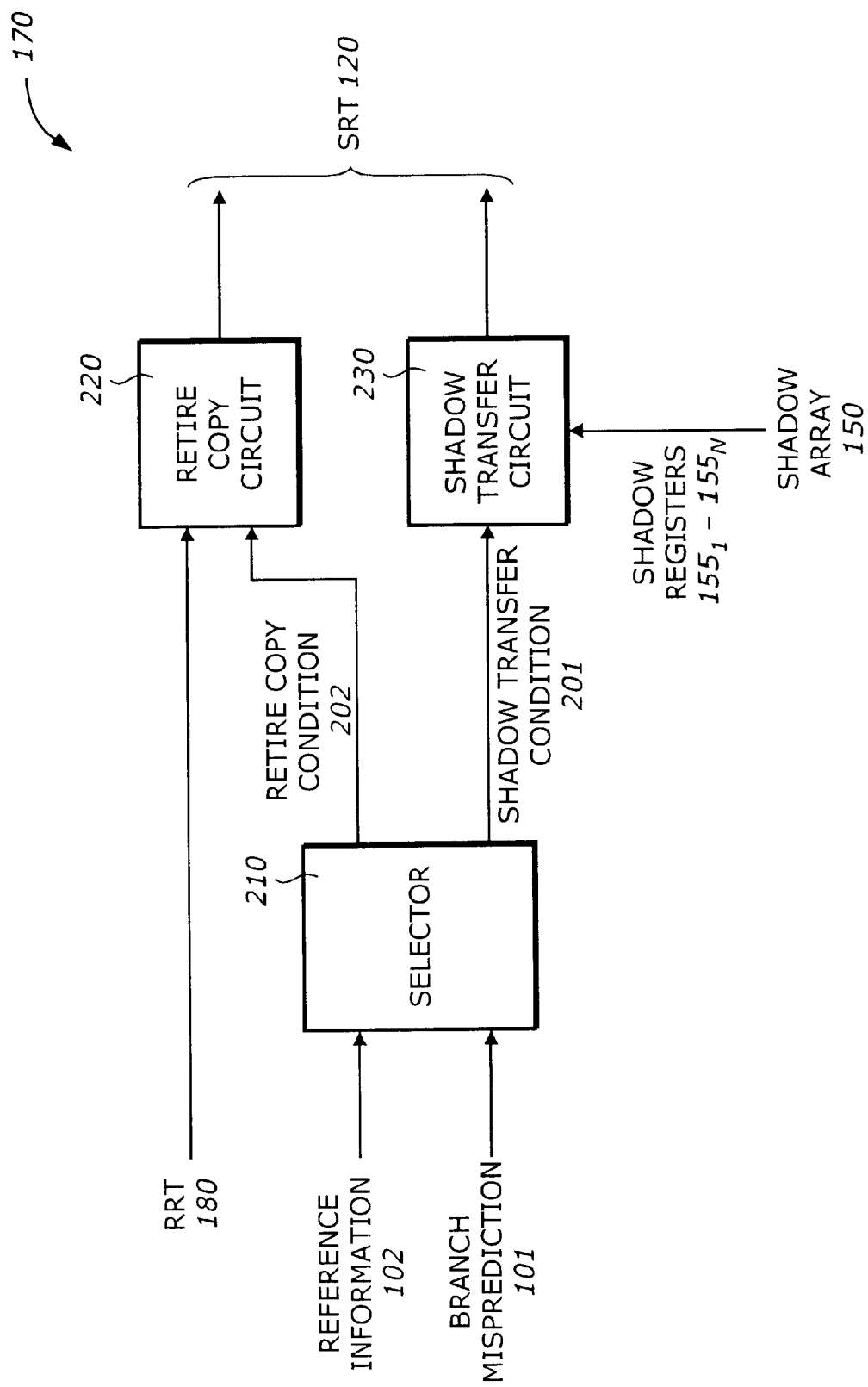
FIG. 2 is a diagram illustrating an update circuit shown in FIG. 1 according to one embodiment of the invention.

FIG. 2 is a diagram illustrating the update circuit 170 shown in FIG. 1 according to one embodiment of the invention. The update circuit 170 includes a selector 210, a retire copy circuit 220, and a shadow transfer circuit 230.

The selector 210 receive the reference information 102 and branch misprediction 101 from the processor core 110. The selector 210 asserts a shadow transfer condition 201 to the shadow transfer circuit 230 and a retire copy condition 202 to the retire copy circuit 220. The shadow transfer condition 201 and retire copy condition 202 may be control signals that trigger a transfer or a copy operation. The selector 210 asserts the shadow transfer condition 201 when a branch misprediction 101 is detected and there is no modification to an infrequent register in the SRT 120 by a non-retiring instruction. The selector 210 asserts the retire copy condition 202 when one of the infrequent registers is modified by a non-retiring instruction and a mispredicted branch instruction 101 is retired. The detection of branch misprediction 110 may be provided by the processor core 110 (FIG. 1), the execution pipeline 130, the re-order buffer 140, or any other appropriate circuit in the processor 100.

The shadow transfer circuit 230 transfers contents all frequent registers 122 after a branch instruction to the SRT 120 when the shadow transfer condition 201 is asserted. The shadow transfer circuit 230 may include a read circuit to read the contents of the shadow array 150, and a write circuit to write the contents to the corresponding frequent registers in the SRT 120 (FIG. 1). The retire copy circuit 220 copies contents of the retire registers 181 in the RRT 180 to the SRT 120 when the retire copy condition 202 is asserted. The copy of the RRT 180 to the SRT 120 is normally performed as a flash copying process which takes place very fast. The flash copy process essentially transfer contents of all the retire registers 181 in the RRT 180 to the corresponding frequent and infrequent registers 122 and 124, respectively, in the SRT 120.

In essence, the update circuit 170 needs only to update the frequent registers when the shadow transfer condition 201 is asserted. Since the number of frequent registers is much less than the total number of registers, this process can take place quickly, leading to enhanced performance. In addition, the amount of silicon area to implement the shadow array is also reduced because of reduced number of registers.

The shadow transfer condition 201 is based on the observation that there is no modification to an infrequent register by a non-retiring instruction when a branch misprediction 101 is detected. This is to undo the effect of a speculative (incorrect) write having occurred to a frequently modified registers. The transfer of the content of a shadow register to the frequent registers 122 (FIG. 1 )in the SRT 120 essentially is to undo this erroneous effect.

Figure 3:
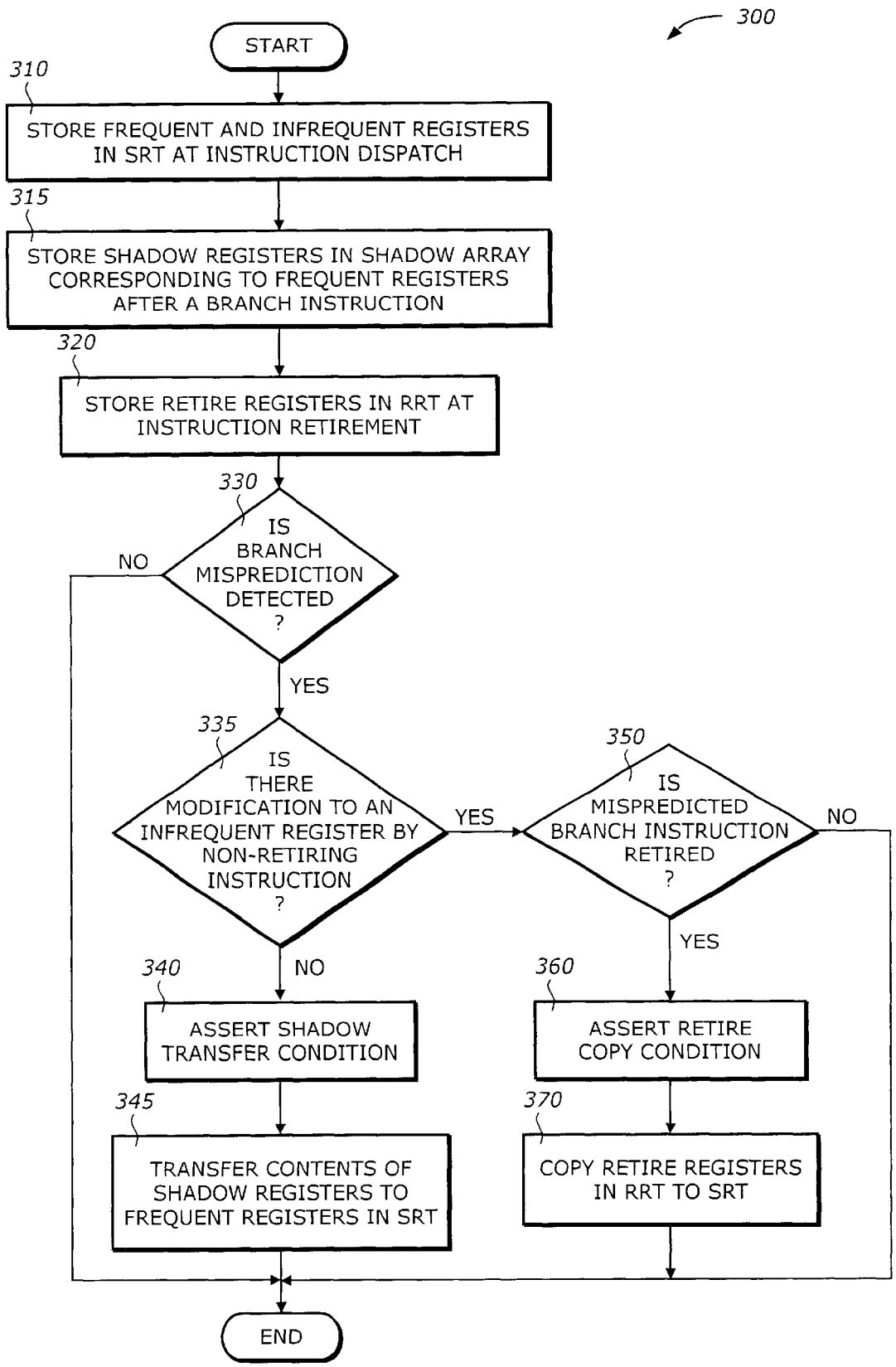
FIG. 3 is a flow chart illustrating a process for a rename recovery according to one embodiment of the invention.

FIG. 3 is a flow chart illustrating a process 300 for a rename recovery according to one embodiment of the invention.

Upon START, the process 300 stores frequent and infrequent registers in the SRT at instruction dispatch from the processor core (Block 310). Then, the process 300 stores the shadow registers in the shadow array (Block 315). Each of the shadow registers corresponds to a frequent register in the SRT after a branch instruction. Then, the process 300 stores the retire registers in the RRT at instruction retirement (Block 320).

Next, the process 300 determines if a branch misprediction is detected (Block 330). If no, the process is terminated. Otherwise, the process 300 determines if there is a modification (e.g., a write) to an infrequent register by a non-retiring instruction (Block 335). If no, the process 300 asserts the shadow transfer condition (Block 340). Then, the process 300 transfers the contents of the shadow registers to the frequent registers in the SRT (Block 345) and is then terminated. Otherwise, the process 300 determines if a mispredicted branch instruction is retired (Block 350). If no, the process 300 is terminated. If yes, the process 300 asserts the retire copy condition (Block 360). Then, the process 300 copies the retire registers in the RRT to the SRT (Block 370) and is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a speculative rename table (SRT) to store mapping of frequent and infrequent registers, the frequent registers being frequently modified by instructions dispatched from a processor core, the infrequent registers being infrequently modified by the instructions;
    a shadow array to store shadow registers, each of the shadow registers containing a rename state of corresponding frequent registers and being associated with a branch instruction; and
    an update circuit coupled to the shadow array to transfer contents of the shadow registers to the frequent registers based on a selection condition.

2. The apparatus of claim 1 further comprising:
    a retired rename table (RRT) to store retire registers corresponding to the frequent and infrequent registers in the SRT, the retire registers containing rename states of the corresponding frequent and infrequent registers at instruction retirement.

3. The apparatus of claim 2 wherein the selection condition includes a shadow transfer condition and a retire copy condition.

4. The apparatus of claim 3 wherein the update circuit comprises:
   a selector to assert the shadow transfer condition and the retire copy condition;
   a shadow transfer circuit coupled to the selector to transfer contents of the frequent registers to the SRT when the shadow transfer condition is asserted; and
   a retire copy circuit coupled to the selector to copy contents of the retire registers in the retired rename table (RRT) to the SRT when the retire copy condition is asserted.

5. The apparatus of claim 4 wherein the selector asserts the shadow transfer condition when a branch misprediction is detected and there is no modification to an infrequent register by a non-retiring instruction.

6. The apparatus of claim 4 wherein the selector asserts the retire copy condition when one of the infrequent registers is modified by a non-retiring instruction and a mispredicted branch instruction is retired.

7. The apparatus of claim 1 wherein the shadow array is stored in a re-order buffer.

8. A method comprising:
   storing mappings of frequent and infrequent registers in a speculative rename table (SRT), the frequent registers being frequently modified by instructions dispatched from a processor core the infrequent registers being infrequently modified by the instructions;
   storing shadow registers in a shadow array, each of the shadow registers containing a rename state of corresponding frequent registers and being associated with a branch instruction; and
   transferring contents of the shadow registers to the frequent registers based on a selection condition.

9. The method of claim 8 further comprising:
   Storing retire registers corresponding to the frequent and infrequent registers in the SRT by a retired rename table (RRT), the retire registers containing rename states of the corresponding frequent and infrequent registers at instruction retirement.

10. The method of claim 9 wherein the selection condition includes a shadow transfer condition and a retire copy condition.

11. The method of claim 10 wherein transferring contents of the shadow registers comprises:
   asserting the shadow transfer condition and the retire copy condition;
   transferring contents of the frequent registers to the SRT when the shadow transfer condition is asserted; and
   copying contents of the retire registers in the retired rename table (RRT) to the SRT when the retire copy condition is asserted.

12. The method of claim 11 wherein asserting the shadow transfer condition comprises asserting the shadow transfer condition when a branch misprediction is detected and there is no modification to an infrequent register by a non-retiring instruction.

13. The method of claim 11 wherein asserting the retire copy comprises asserting the retire copy condition when one of the infrequent registers is modified by a non-retiring instruction and a mispredicted branch instruction is retired.

14. The method of claim 8 wherein the shadow array is stored in a re-order buffer.

15. A processor comprising:
   a processor core to dispatch instructions; and
   a rename recovery circuit comprising:
      a speculative rename table (SRT) to store mappings of frequent and infrequent registers, the frequent registers being frequently modified by instructions dispatched from the processor core, the infrequent registers being infrequently modified by the instructions,
      a shadow array to store shadow registers, each of the shadow registers containing a rename state of a corresponding frequent register and being associated with a branch instruction, and
      an update circuit coupled to the shadow array to transfer contents of the shadow registers to the frequent registers based on a selection condition.

16. The processor of claim 15 wherein the rename recovery circuit further comprising:
   a retired rename table (RRT) to store retire registers corresponding to the frequent and infrequent registers in the SRT, the retire registers containing rename states of the corresponding frequent and infrequent registers at instruction retirement.

17. The processor of claim 16 wherein the selection condition includes a shadow transfer condition and a retire copy condition.

18. The processor of claim 17 wherein the update circuit comprises:
   a selector to assert the shadow transfer condition and the retire copy condition;
   a shadow transfer circuit coupled to the selector to transfer contents of the frequent registers to the SRT when the shadow transfer condition is asserted; and
   a retire copy circuit coupled to the selector to copy contents of the retire registers in the retired rename table (RRT) to the SRT when the retire copy condition is asserted.

19. The processor of claim 18 wherein the selector asserts the shadow transfer condition when a branch misprediction is detected and there is no modification to an infrequent register by a non-retiring instruction.

20. The processor of claim 17 wherein the selector asserts the retire copy condition when one of the infrequent registers is modified by a non-retiring instruction and a mispredicted branch instruction is retired.

21. The processor of claim 15 wherein the shadow array is stored in a re-order buffer.

* * * * *